(12) United States Patent
Van Os et al.

(10) Patent No.: US 9,989,243 B2
(45) Date of Patent: Jun. 5, 2018

(54) TEXTILE OPTICS—SOLUTION FOR ROBUST FLEXIBLE LIGHT TREATMENT PADS

(71) Applicant: Philips Lighting Holding B.V., Eindhoven (NL)

(72) Inventors: Jacobus Petrus Johannes Van Os, Eindhoven (NL); Kunigunde Hadelinde Cherenack, Eindhoven (NL); Roland Marinus Schuurbiers, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 14/899,043

(22) PCT Filed: Aug. 8, 2014

(86) PCT No.: PCT/EP2014/067045
§ 371 (c)(1),
(2) Date: Dec. 16, 2015

(87) PCT Pub. No.: WO2015/024794
PCT Pub. Date: Feb. 26, 2015

(65) Prior Publication Data
US 2016/0153651 A1 Jun. 2, 2016

(30) Foreign Application Priority Data
Aug. 21, 2013 (EP) .................................. 13181221

(51) Int. Cl.
*F21V 33/00* (2006.01)
*B29C 39/10* (2006.01)
(Continued)

(52) U.S. Cl.
CPC .......... *F21V 33/0008* (2013.01); *B29C 39/10* (2013.01); *B29C 43/18* (2013.01);
(Continued)

(58) Field of Classification Search
CPC ..... F21V 33/0008; B29C 39/10; B29C 39/18; B32B 37/0076; B32B 3/06; B32B 3/08;
(Continued)

(56) References Cited

U.S. PATENT DOCUMENTS 4,931,178 A * 6/1990 Manniso .............. B01D 25/001
210/228
5,236,532 A 8/1993 Taylor
(Continued)

FOREIGN PATENT DOCUMENTS

CN 1653148 A 8/2005
CN 101368339 A 2/2009
(Continued)

*Primary Examiner* — William P Bell

(57) ABSTRACT

A method of bonding a silicone-based element to a textile based element is provided. The method comprises steps that enable a user to bond a silicone-based element to a textile based element using a fibrous material to strengthen the bond. An assembly constructed according to the method is also provided. This assembly is particularly suited to being disposed against skin due to the high biocompatibility of silicone, particularly PDMS.

11 Claims, 7 Drawing Sheets

(51) Int. Cl.
  *B32B 7/14* (2006.01)
  *B29C 43/18* (2006.01)
  *B32B 27/12* (2006.01)
  *B32B 27/28* (2006.01)
  *B32B 37/00* (2006.01)
  *B32B 3/06* (2006.01)
  *B32B 3/08* (2006.01)
  *B32B 3/26* (2006.01)
  *F21V 5/00* (2018.01)

(52) U.S. Cl.
  CPC ............... *B32B 3/06* (2013.01); *B32B 3/08* (2013.01); *B32B 3/266* (2013.01); *B32B 7/14* (2013.01); *B32B 27/12* (2013.01); *B32B 27/283* (2013.01); *B32B 37/0076* (2013.01); *F21V 5/00* (2013.01); *B29C 2043/181* (2013.01)

(58) Field of Classification Search
  CPC ........... B32B 3/266; B32B 7/14; B32B 27/12; B32B 27/283
  See application file for complete search history.

(56) References Cited

U.S. PATENT DOCUMENTS

| | | |
|---|---|---|
| 2008/0205035 A1 | 8/2008 | Asvadi |
| 2010/0061101 A1 | 3/2010 | Pieterson |

FOREIGN PATENT DOCUMENTS

| | | |
|---|---|---|
| CN | 102272947 A | 12/2011 |
| CN | 102825864 A | 12/2012 |
| EP | 1192958 A2 | 4/2002 |
| EP | 1657758 A2 | 5/2006 |
| EP | 1661682 A1 | 5/2006 |
| JP | 04119833 A | 4/1992 |
| JP | 06511046 A | 12/1994 |
| JP | 2007152826 A | 6/2007 |
| WO | 2008120134 A1 | 10/2008 |
| WO | 2009052015 A3 | 4/2009 |

* cited by examiner

TEXTILE OPTICS—SOLUTION FOR ROBUST FLEXIBLE LIGHT TREATMENT PADS

CROSS-REFERENCE TO PRIOR APPLICATIONS

This application is the U.S. National Phase application under 35 U.S.C. § 371 of International Application No. PCT/EP2014/067045, filed on Aug. 8, 2014, which claims the benefit of European Patent Application No. 13181221.6; filed on Aug. 21, 2013. These applications are hereby incorporated by reference herein.

TECHNICAL FIELD

The present disclosure relates to a method of bonding a silicone-based element to a textile-based element. A further aspect is an assembly based upon such a method.

BACKGROUND

The use of a silicone-based element is common in numerous fields; the silicones have the attractive properties of having high optical transparency and are also biocompatible. Biocompatibility is defined as "the quality of not having toxic or injurious effects on biological systems". This allows them to be placed against a body, such as a human body, without causing any irritation. One such silicone is Polydimethylsiloxane (PDSM). PDMS is widely selected as the preferred material when the item to be utilized is in contact with the human body, especially in contact with the skin. This is because the PDMS exhibits non-irritating and non-sensitizing behavior. Another important consideration when the PDMS is to be used in contact with the human skin is its suitability for sterilization, both steam and Ethylene Oxide (ETO).

Textiles are by far the most flexible, comfortable and skin compatible materials for wearing near or on a body, such as a human body.

There is a disadvantage when combining silicones and textiles into wearable or skin compatible devices or garments, and that is they are difficult to bond to each other in a reliable or cost effective way.

Therefore, a desire exists for improved bonding methods between silicone and textile elements.

SUMMARY

In a first aspect, according to claim 1, an improved bonding method between a silicone-based element, such as a PDMS based element, and a textile based element is provided. The method increases the bond strength and therefore the bond reliability between a silicone-based element and a textile based element.

In one embodiment, the silicone-based element, which can be realized by a number of techniques such as cast or injection molding, is provided with fibres. These fibres may be provided as a fibrous sheet which is arranged to at least partially contact the silicone-based element such that the silicone-based element permeates and entangles at least a portion of the fibrous sheet. The permeation and entangling is preferably created while the silicone is in an uncured state and is finalized by curing the silicone. The entangling of at least one portion of the fibrous material with the silicone provides the advantage of increasing the bond strength between the fibrous material and the silicone whilst leaving another portion of the fibrous material free to be entangled with a further substance, this further substance preferably being a suitable bonding agent for bonding the silicone/fibrous material assembly to a further element.

In a preferred embodiment, the method includes the additional step of positioning a fibrous surface of a silicone-based element upon a bonding surface of a textile based element; wherein at least a region of the fibrous surface of the silicone-based element comprises portions of the fibrous material.

In a further embodiment of the method, the fibrous surface of the silicone-based element may be coated/pre-impregnated with a bonding agent before positioning and placing the fibrous surface upon the bonding surface of the textile based element. An example of a suitable bonding agent is Polyurethane (PU). The pre-impregnation may comprise pre-impregnating the fibrous material before entangling it with the silicone or it may comprise uniformly coating or dispensing a mixture of pre-impregnating material and fibres onto the silicone. It therefore removes the need for the operator to follow any additional steps to prepare the silicone-based element, especially the fibrous surface thereof, before bonding the silicone-based element to the textile based element. This increases efficiency and removes the requirement to store bonding agents.

In another embodiment of the method, the fibres may be uncoated and a further method step may be the application of a suitable bonding agent to the fibrous material after the silicone has cured. This allows the operator to precisely tailor the application of the bonding agent to the specific requirements of bonding the two elements; be that due to geometric constraints or desired operational requirements.

A yet further embodiment of the method may include the step of the operator placing the fibrous surface of the silicone-based element upon the bonding surface of the textile based element before the bonding agent has cured. This provides the advantage of the bonding between the two elements being completed with no further additional steps.

A yet further embodiment of the method may include the use of a dual-cure adhesive, this may allow the additional step of placing the bonding surface of the textile based element upon the fibrous surface of the silicone-based element after the bonding agent has preliminarily cured. This step provides the advantage of allowing the silicone-based element and textile based element to be manufactured separately and stored separately whilst still having all manufacturing steps completed, i.e. the bonding agent is applied to the fibrous material and allowed to preliminarily cure before the silicone-based element is stored. Once the silicone-based element and the textile based element are brought into contact then the second stage of curing may be implemented.

In one embodiment, the method may include the additional preferred step of applying heat to the silicone-based element and textile based element to heat activate the bonding agent. This gives the advantage, when combined with the previous embodiment of the method, of allowing the possibility of different method steps to be completed in different locations. For example, the silicone-based element may be manufactured by one supplier, the bonding agent may be applied (if the fibrous material is not pre-impregnated) and then the silicone-based element may be stored at a first location. Simultaneously another supplier can manufacture and store the textile based element at a second location and at a third location the two elements may be received, assembled according to the method described and bonded by activating the bonding agent.

In another aspect of the invention, an assembly of a silicone-based element and a textile based element is disclosed.

In an embodiment thereof, the silicone-based element may comprise a fibrous surface, said fibrous surface further comprises fibres partially entangled in the silicone and partially protruding from the silicone. The fibres may be part of the fibrous material partially entangled in the silicone. The textile based element may comprise a flexible conductive element. The conductive element may preferably be an electrically active textile fabric or using another printed circuit technology. Furthermore, arranged upon a first surface of the electrically active textile fabric there may be at least one electrically active component, for example a Light Emitting Diode (LED).

In a yet further preferred embodiment of the assembly the silicone-based element may be shaped to have impression(s), arranged to correspond to the location(s) of the electrically active component(s) arranged on the electrically active textile fabric. These impressions may be shaped as a transparent or translucent cap, lens or knob and further may be of a round construction, square construction or any combination thereof including geometric and random shapes.

At least a portion of the silicone-based element may be formed into a desired shape by molding, either injection molding or casting or by patterning the silicone-based element by locally adding, removing or reshaping (e.g. embossing) silicone material from the silicone-based element.

In a preferred embodiment of the assembly the fibrous material may be provided as a sheet, the sheet may be provided with holes that correspond with the arrangement of the electrically active components, these electrically active components preferably being LEDs and the holes in the fibrous sheet allowing the optimum transmission of light through the silicone-based element. The holes provided in the sheet may also provide a means of counteracting any misalignment of the electrically active components with the fibrous material; this may be achieved by stretching and/or deforming the fibrous material in the X-Y plane.

In a further preferred embodiment the assembly may be constructed in the above manner and holes may be formed through the assembly in an aligned orientation. These holes may be located between the electrically active components and they increase the breathability of the assembly whilst not allowing gas or liquid to contact the electrically active components within the assembly. These holes may be formed in each element when manufactured taking care that each element's holes will align with the next when bonding occurs or more preferably the holes may be formed through the assembly once bonding has been completed thus ensuring the alignment of the holes.

The electrically active components preferably comprise one or more LEDs, the use of LEDs as a light source offers numerous benefits; e.g. they are compact which facilitates their use in a non-bulky and flexible assembly which can be worn, they generate limited heat, they are energy efficient when compared to other light sources and a plurality of LEDs can be switched according to numerous sequences to provide a massaging effect.

According to one embodiment the electrically active component may be an LED emitting in the blue light range of approximately 450-495 nm; other ranges of wavelengths may be used; these are violet (380-450 nm), green (495-570 nm), yellow (570-590 nm), orange (590-620 nm) and red (620-750 nm). Any combination of one or more of the disclosed ranges may be used.

In at least one embodiment the silicone-based element may be formed by molding silicone material, it may be either cast or injection molded. The silicone material is dispensed into a mold; this mold may have a single cavity or it may have a plurality of cavities. If the mold has a plurality of cavities arranged within, there is preferably a region that conjoins the cavities; this region may be recessed into a first surface of the mold. When molded in this way a sheet of silicone material with a plurality of impressions formed upon a first surface is created. These impressions may correspond to the locations of the light sources. Once the silicone material has been dispensed into the mold, the fibrous material is applied, ensuring that the silicone material partially waters the fibrous material.

The impressions may be of any geometric or random shape or combinations thereof. This allows the optimum shape or range of shapes to suit the arrangement and individual requirements of the electrically active components used in the assembly.

Injection molding is a known technique using a machine to inject material into a mold cavity under pressure and so will be briefly discussed. An injection molding machine is usually configured to manufacture a product using a mold tool consisting of 2 main assemblies. These are known as the male and female halves of the mold. The female half of the mold has the impressions recessed into its surface whilst the male mold has the impressions raised on its surface. When the two halves of the mold are brought together, the region into which the material will flow and thus the product will be formed is known as the cavity. Linear alignment of the two halves is ensured by the use of posts on one half of the mold (usually the male half) with corresponding holes on the female half. The posts are usually located on the male half due to the desire to protect the raised molding impressions on its surface.

The injection molding machine is fitted with platens, these are base plates upon which the two halves of the mold tool will be located, they are usually vertical in a horizontal type injection molding machine and horizontal in a vertical type injection molding machine. One of the platens is located on a series of rails allowing it to traverse in a linear fashion and the other is fixed in place, these are known as the travelling platen and the fixed platen respectively.

The mold tool is fixed to the platens, one half of the mold to each platen; and the machine is operated so that the tool halves align and the parting faces touch. Pressurized material is then fed into the cavity and the mold is kept pressed together until the material has cooled sufficiently to maintain dimensional stability.

The travelling platen and its respective attached mold half move away from the fixed platen and its respective attached mold half and the molded item may be removed from the cavity. The entire time from when the mold is pressed together, the material is injected, sufficient cooling of the material to ensure dimensional stability occurs, the mold is separated and the molded item is removed from the cavity is known as the cycle time.

As production requirements increase and therefore a shorter cycle time is desired additional techniques may be employed. The mold halves, for example, may be cooled; this is usually achieved by water-cooling. A chilled fluid is circulated around the mold halves by a series of internal drillings that are connected to an external chiller.

The female half of the mold may be fitted with ejector pins. These pins remove the molded part from the female cavity once the mold halves are open, this allows the machine to be fully automated, i.e. the molding machine is filled with the required material and then numerous cycles can run sequentially as the molded part is automatically ejected from the mold at the end of each cycle.

If additional items are required in the molded part, a technique known as insert loading may be used and numerous materials and fixings may be incorporated in this way. The mold is configured to locate the insert in the desired position; this may be as simple as drilling a hole to accept a stud or magnets may be used to locate ferrous inserts. The insert is loaded into the mold before molding of the part commences.

PDMS is an example of a silicone material and is a two part elastomer, one part is a base and the second part is a curing agent. These can be injection molded in the above manner but care must be taken to ensure that crosslinking does not occur in the barrel of the injection molding machine as it would be extremely difficult to remove the cured material and damage to the machine would be a very likely outcome. The curing agent is normally added to the base part just before the injection nozzle thus minimizing the distance that the mixed 2 part elastomer has to travel through the machine.

Another widely used method of molding is casting. This method is easier to use for molding a material which is liquid before curing such as a 2 part polymer wherein one part is a base and the other is a curing agent; as well as when a material is molten. Cast molding is a technique wherein a material is poured or dispensed into a mold with a cavity of the desired shape. These molds are usually called cast molds to differentiate them from the injection molds that were discussed above. There are numerous types of cast molds with differing levels of complexity. The simplest may be a single plate with a single impression formed into its pour surface, that is to say the surface that is usually uppermost; this type of mold is commonly called a tray mold. The tray mold is easily adaptable to have a multi-impression array formed in its pour surface. These multi-impression molds allow the casting of more complex parts or simply to increase production.

More complex cast molds may have a core that forms the inner profile of a molded part; it is similar in function to the male part of the injection mold. When the molded part has cooled sufficiently after pouring, the core is removed, the molded part is removed and then the core is replaced ready for the next pour. Inserts can also be used in cast molds.

In one embodiment of the assembly a cast mold may be used to form the silicone-based element. The mold may have multiple cavities in an array; the multiple cavities may have a region that conjoins them, this conjoining region is below a pour line of the mold. The mold is filled with the silicone material to the pour line, and a layer of the silicone material conjoins the cavities. The fibrous material may be provided as a fibrous sheet with holes that correspond to the locations of the cavities and may furthermore correspond to the locations of the electrically active components.

The fibrous material may be placed into the mold and capillary action causes the silicone material to flow into, and at least partially wet a portion of the fibrous material. As no further silicone material is dispensed into the mold the capillary action causes depressions to form in the center of the surface of the silicone material in the cavities thus creating impressions into which the electrically active components may be located. The fibrous material may be applied before the silicone has cured thus ensuring that the entanglement between the fibrous material and the silicone material is as well developed as possible.

In a further embodiment of the assembly a cast mold with a removable core may be used. When cast the method is similar to that disclosed above; i.e. the silicone material may be dispensed into the mold until the level of the top of the silicone material just covers the conjoining region. The fibrous material may be provided as a sheet, which may preferably have holes corresponding to the location of the cavities and which may furthermore preferably correspond to the location of the electrically active components. This fibrous material may be applied to the surface of the silicone material, and then the core, which can be thought of as a male half of the mold may be inserted. The mold core has raised impressions that correspond to the required inner profile of the silicone-based element. The fibrous material may be applied to the mold core before the mold core is inserted into the mold. When inserted the mold core will ensure that the optimum amount of silicone material will entangle with at least a portion of the fibrous material whilst any excess of silicone material will be ejected from the tool.

DETAILED DESCRIPTION OF THE INVENTION

Figure 1:
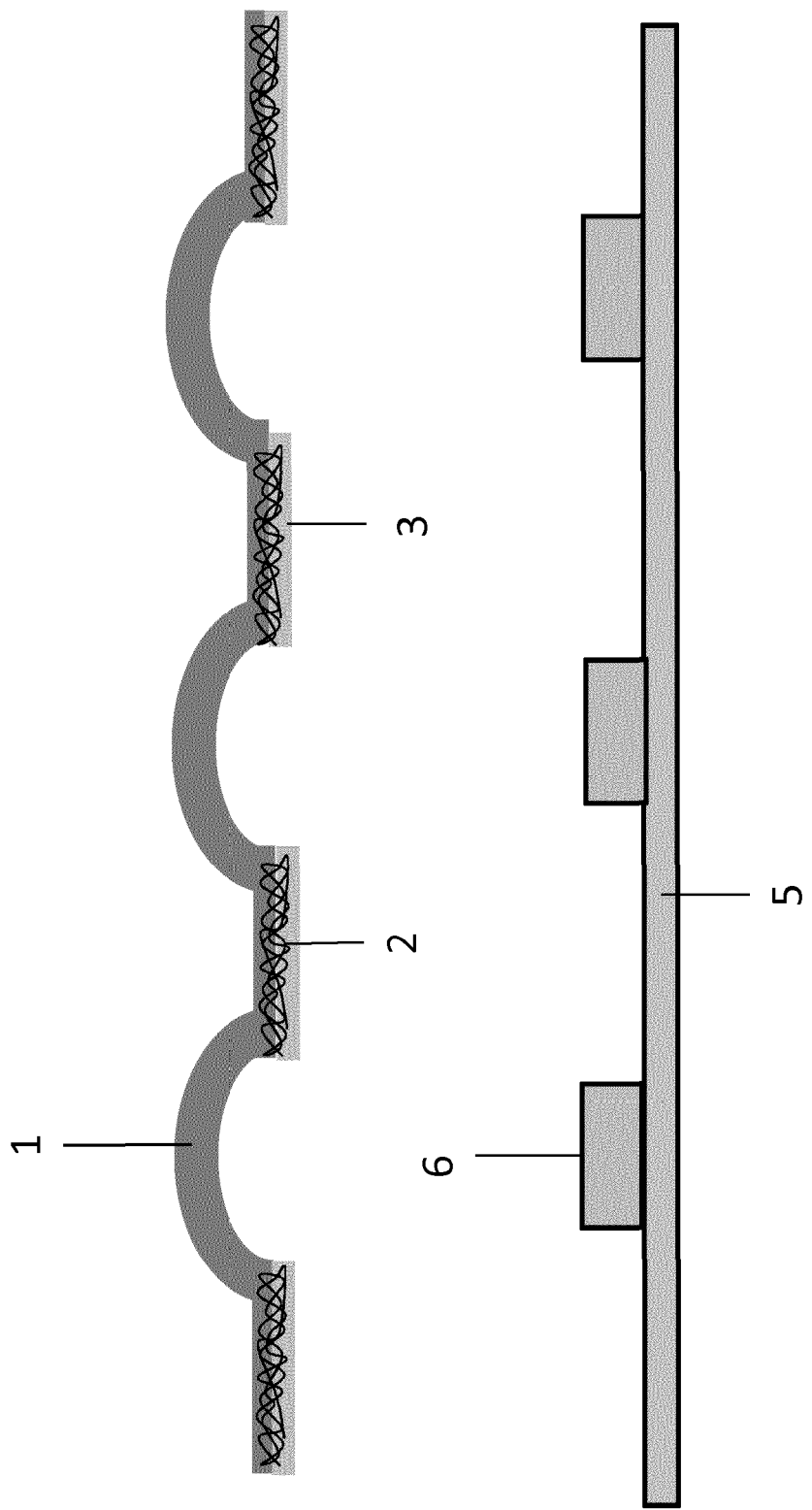
FIG. 1 is an exploded, sectional view of an embodiment of an assembly constructed according to the method.

FIG. 1 is an exploded, sectional view of an exemplary assembly constructed according to the method. The silicone-based element 1 is entangled with at least a portion of a fibrous material 2 and a bonding agent 3. The textile based element 4 may comprise an electrically active textile fabric 5 and electrically active components, preferably LEDs 6, placed upon a connecting surface of the electrically active textile fabric. The fibrous material 2 and the bonding agent 3 ensure a strong bond between the silicone-based element 1 and the electrically active textile fabric 5.

Figure 2:
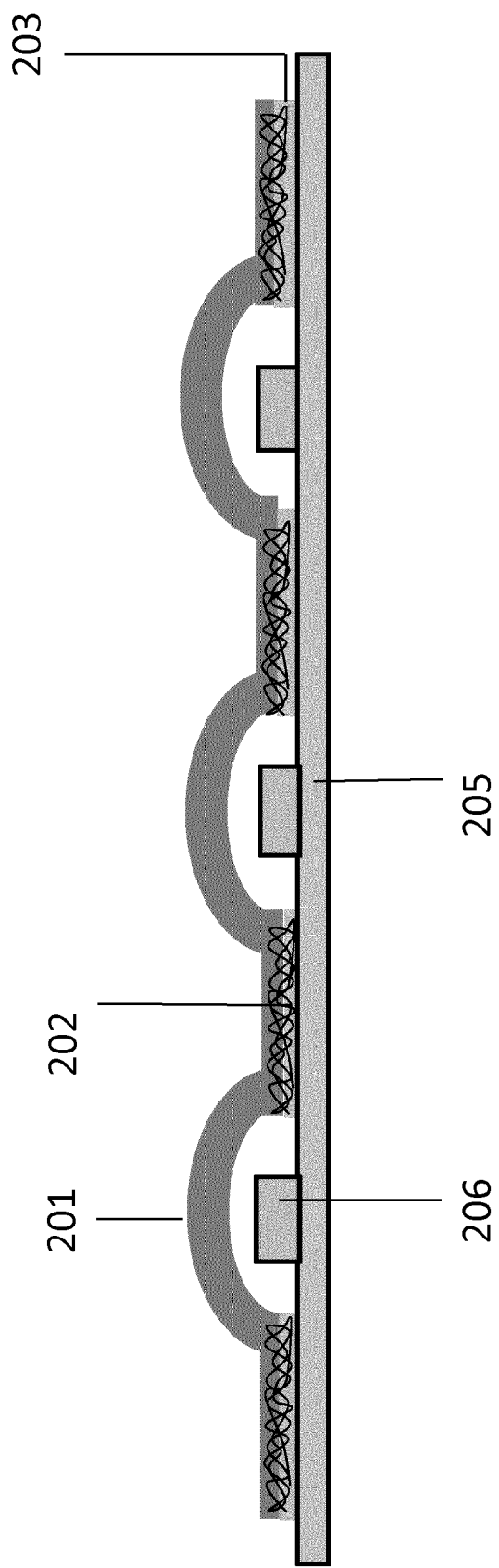
FIG. 2 is a sectional view of an embodiment of an assembly constructed according to the method.

FIG. 2 is a sectional view of an embodiment of an assembly constructed according to the method; the electrically active components 206 may be arranged upon a connecting surface of the electrically active textile fabric 205. In this embodiment the electrically active components may be LEDs; these LEDs emit light through the silicone-based element 201. The fibrous material 202 may be applied as a sheet which has holes provided which correspond to the positions of the LEDs. This allows the light emitted by the LEDs to exit the assembly without having to pass through the fibrous material 202. The fibrous material 202 and bonding agent 203 provide a bond between the silicone-based element 201 and the electrically active textile fabric 205.

Figure 3:
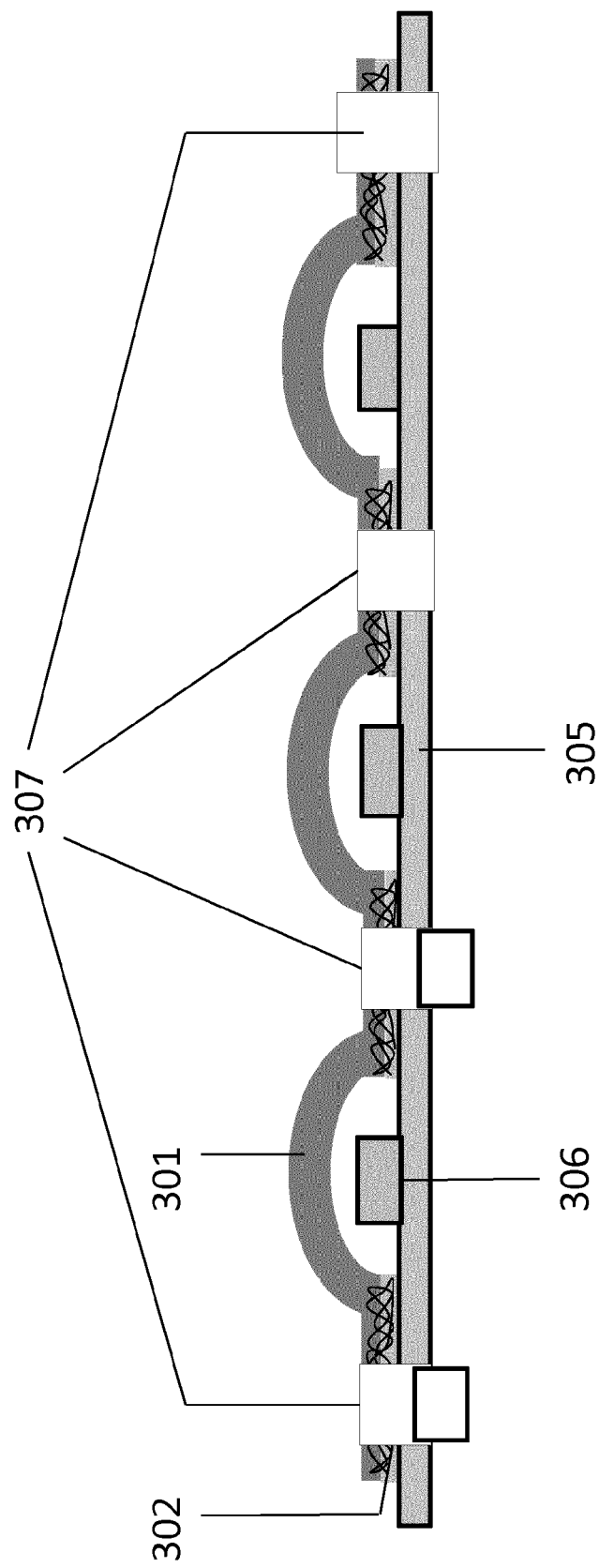
FIG. 3 is a sectional view of a further embodiment of an assembly constructed according to the method showing the through holes.

FIG. 3 is a sectional view of a yet further embodiment of an assembly constructed according to the method. The electrically active components 306 may be arranged upon a first surface of the electrically active textile fabric 305. In this embodiment the electrically active components may be LEDs which emit light through the silicone-based element 301. The fibrous material 302 may be applied as a sheet which has holes provided which correspond to the positions of the LEDs. There are through-holes 307 that pass through the entire assembly, these may be formed in a variety of known ways, i.e. the holes may be formed in each item as it is manufactured and then carefully aligned during construction of the assembly, or more preferably the assembly may be constructed according to the method and once completed the holes 307 may be formed through the assembly. These through-holes allow gas and liquid to pass through the assembly whilst ensuring that the gas or liquid cannot contact the electrically active components 306 within the assembly. This feature may be particularly suited to increasing the breathability of the assembly so that comfort is improved if the assembly is worn next to the skin.

Figure 4:
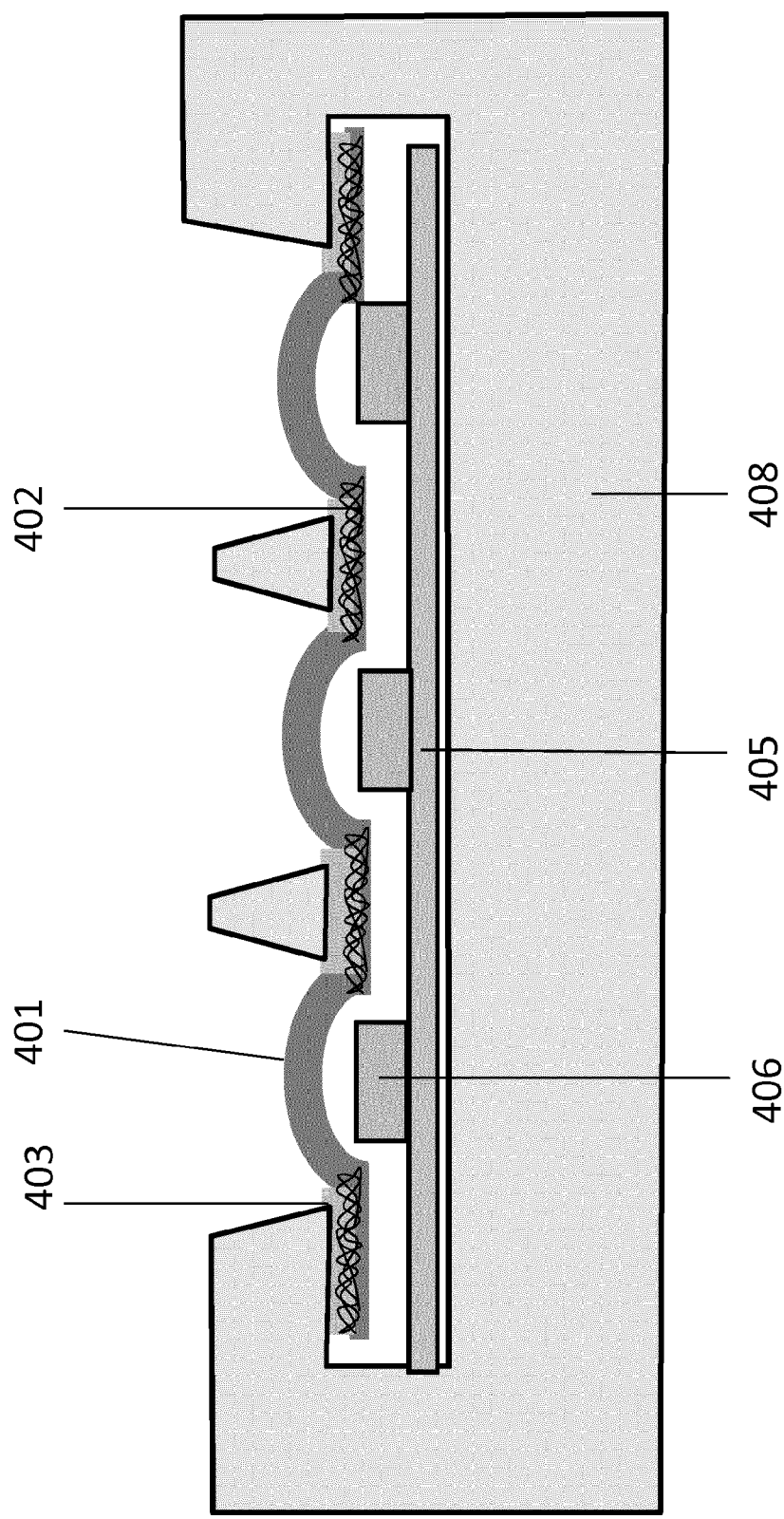
FIG. 4 is a sectional view of a further embodiment of an assembly constructed according to the method.

FIG. 4 is a sectional view of a yet further embodiment of an assembly that may be constructed according to the method. The assembly is placed within a housing 408. The fibrous material 402 may be located between the bonding agent 403 and the silicone-based element 401. The bonding agent 403 may be arranged to bond directly to the housing 408. The bonding agent 403 ensures that the electrically active components 406 which may be arranged upon the connecting surface of the electrically active textile fabric 405 within the assembly are not affected by gas or liquid thus making the assembly particularly suited for use in situations where the assembly is worn next to skin.

Figure 5:
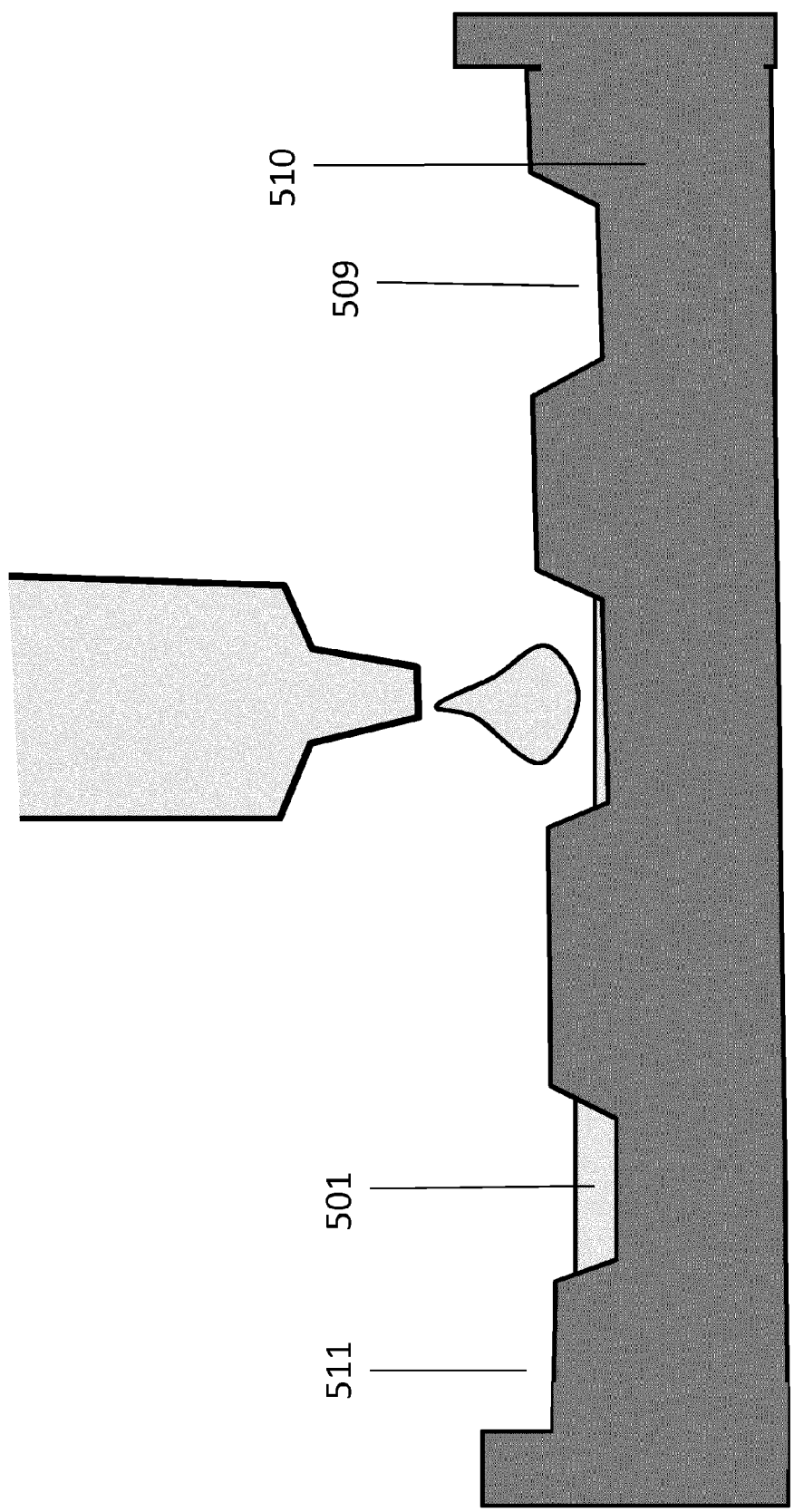
FIG. 5 is a sectional view of an embodiment of a cast mold that may be utilized in the construction of an assembly according to the method.

FIG. 5 is a sectional view of an embodiment of a cast mold that may be utilized in the construction of an assembly according to the method. A silicone-based element 501 manufactured from a silicone material, for example PDMS, may be dispensed into a cavity 509 formed into a surface of a mold 510. To increase production rates and to allow for more complex silicone-based elements 501 to be manufactured a mold with a plurality of cavities 509 formed into a surface may be preferable. There may also be a region 511 formed into the same face of the mold as the cavities 509, this region 511 conjoins the cavities 509.

Figure 6:
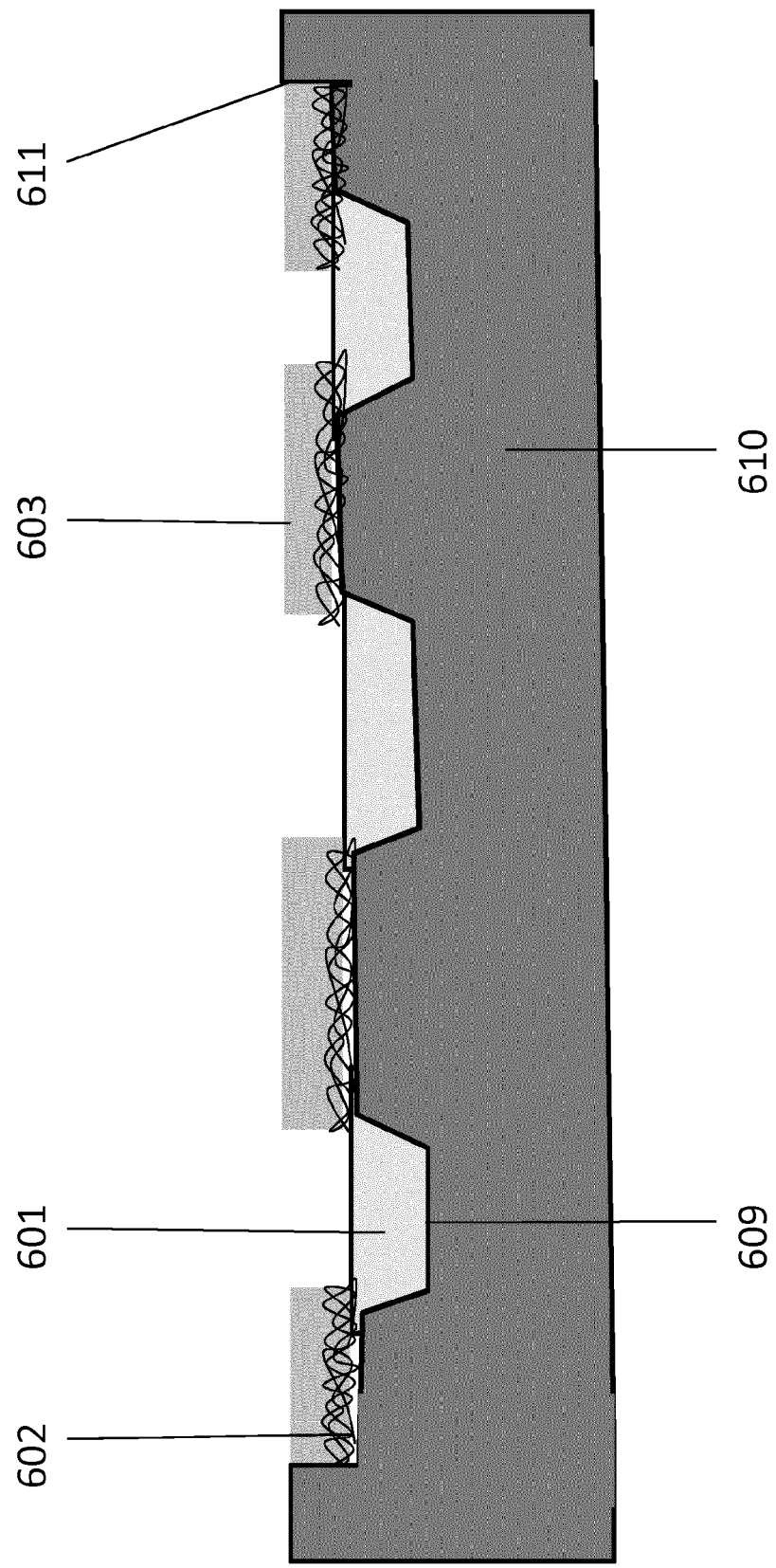
FIG. 6 is a sectional view of an embodiment of an assembly constructed according to the method before capillary action occurs.

FIG. 6 is a sectional view of an embodiment of a silicone-based element 601 that may be constructed according to the method. A silicone-based element 601 manufactured from a silicone material, for example, PDMS may be dispensed according to FIG. 5 into a mold 610. The silicone material used to manufacture the silicone-based element 601 may be filled to a level that covers the base of region 611. Before the silicone material cures a fibrous material 602 may be placed upon the surface of the silicone material, care must be taken to ensure the fibrous material 602 does not extend over the silicone material that has filled the cavities 609. This may easily be achieved by providing the fibrous material 602 as a fibrous sheet which may have suitable holes that correspond with the location of the cavities. The bonding agent 603 may then be applied.

Figure 7:
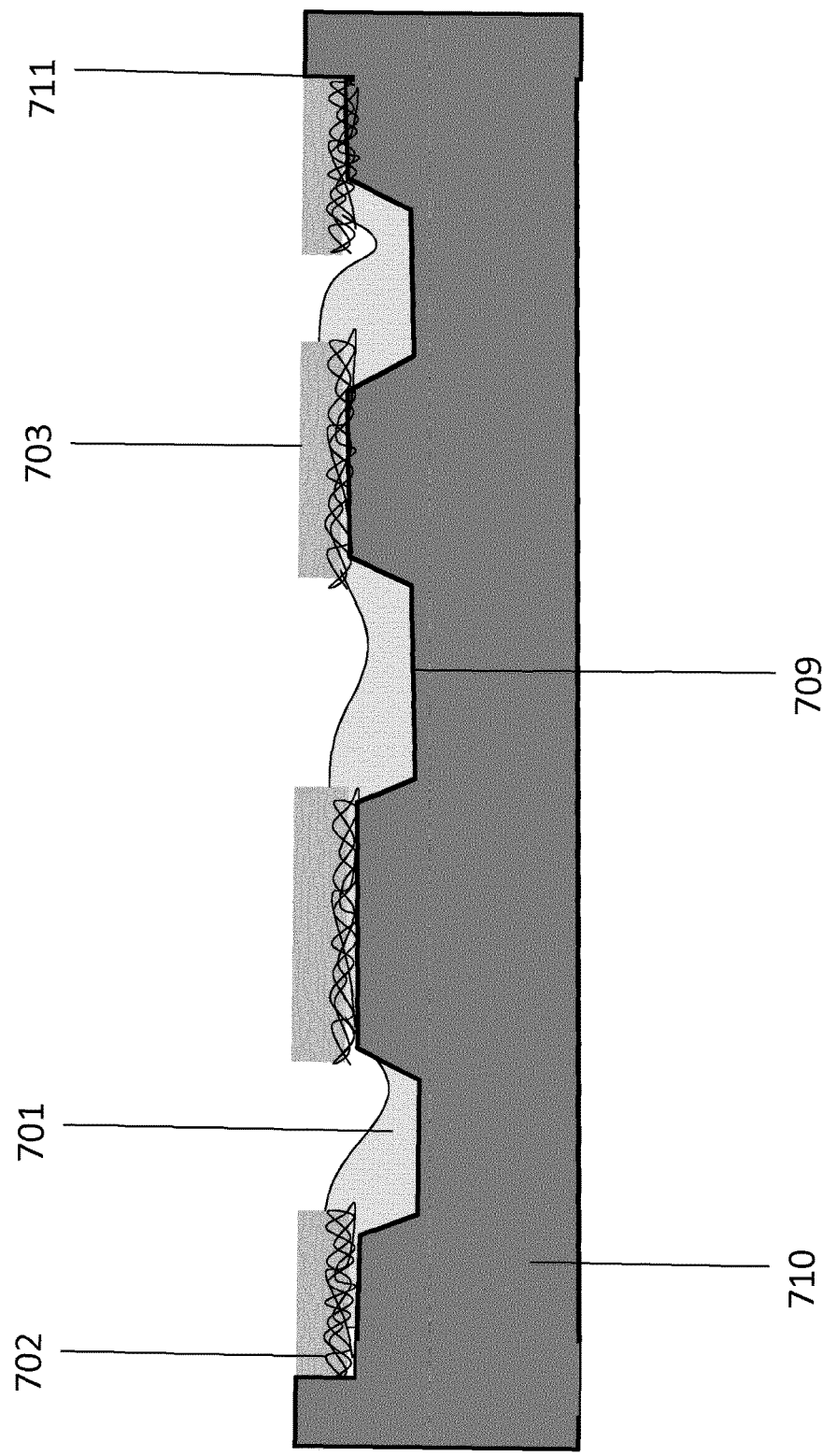
FIG. 7 is a sectional view of an embodiment of an assembly constructed according to the method after capillary action has occurred.

FIG. 7 is a sectional view of an embodiment of a silicone-based element that may be constructed according to the method. The silicone-based element 701 manufactured from a silicone material, for example PDMS may be filled to a level that covers the base of region 711 within the mold 710. Before the silicone material cures a fibrous material 702 may be placed upon the surface of the silicone material, care must be taken to ensure the fibrous material 702 does not extend over the silicone material that has filled the cavities 709. This may easily be achieved by providing the fibrous material 702 as a fibrous sheet with suitable holes that correspond with the location of the cavities. The bonding agent 703 may then be applied. Capillary action causes the silicone material to flow into at least a portion of the fibrous material 702, thus partially wetting the fibrous material; as no further silicone material is dispensed into the mold 710 the capillary action may cause depressions to form in the center of the surface of the silicone material in the cavities 709 thus creating impressions into which the electrically active components may be located.

The invention claimed is:

1. A method for bonding a silicone-based element to a textile based element, comprising the steps of;
   pouring a silicone material into a mold, wherein the mold defines cavity regions that are at least partially filled by the silicone material;
   providing a fibrous material;
   engaging a first surface of the fibrous material with the silicone material so as to avoid having the fibrous material extending over the silicone material that has filled the cavity regions and to partially wet the fibrous material in the silicone material;
   at least partially curing the silicone material such that the fibrous material is partially embedded in the silicone material;
   providing a textile element; and bonding the silicone-based element to the textile based element by means of a bonding agent, said fibres in the fibrous material strengthening the bond between the silicone-based element and the textile based element.

2. The method according to claim 1, wherein the bonding agent is applied to at least one of the fibrous material or textile based element.

3. The method according to claim 1, wherein the fibrous material comprises a fibrous sheet or individual fibres.

4. The method of claim 3, wherein the step of providing the fibrous material comprises the step of pre-coating the fibrous material with the bonding agent.

5. The method according to claim 4, wherein the step of bonding the silicone-based element to the textile based element comprises the steps of positioning the silicone-based element onto the textile based element, with the second surface of the fibrous material facing the textile based element, and curing the bonding agent.

6. The method according to claim 4, further comprising the step of patterning the silicone-based element by at least one of:
   patterning a layer of silicone material by locally adding or removing silicone material respectively from the layer of silicone material; and,
   patterning the fibrous material and the bonding agent so as to define bonding regions for bonding the silicone-based element to the textile based element.

7. A method according to claim 4, wherein the step of bonding the silicone-based element to the textile element comprises heat activating the bonding agent.

8. A method according to claim 7, wherein said bonding agent is polyurethane.

9. The method according to claim 3, wherein the step of bonding the silicone-based element to the textile based element further comprises applying a bonding agent to a second surface of the fibrous material, opposite the first surface of the fibrous material, after curing the silicone material.

10. A method according to claim 1, wherein the fibrous material comprises a fibrous sheet having holes whose positions correspond with the cavity regions.

11. A method according to claim 1, wherein capillary action caused by the fibrous material results in a depression forming in the silicone material in at least one of the cavity regions.

* * * * *